United States Patent [19]

Kotwicki

[11] 4,249,416
[45] Feb. 10, 1981

[54] APPARATUS FOR MEASURING ENGINE TORQUE

[75] Inventor: Allan J. Kotwicki, Sterling Heights, Mich.

[73] Assignee: General Motors Corporation, Detroit, Mich.

[21] Appl. No.: 51,355

[22] Filed: Jun. 25, 1979

[51] Int. Cl.³ .............................................. G01L 3/00
[52] U.S. Cl. ................................................. 73/133 R
[58] Field of Search ................. 73/116, 133 R, 136 A; 324/83 D

[56] References Cited

U.S. PATENT DOCUMENTS

| 3,683,684 | 8/1972 | Judlowe | 73/136 A |
| 3,897,766 | 8/1975 | Pratt, Jr. et al. | 123/146.5 A |
| 4,008,600 | 2/1977 | Bremer, Jr. et al. | 73/11 |
| 4,122,709 | 10/1978 | Brown et al. | 73/136 A |

Primary Examiner—Jerry W. Myracle
Attorney, Agent, or Firm—Warren D. Hill

[57] ABSTRACT

A measure of engine torque can be obtained by measuring the difference between crankshaft oscillations at the front and rear end of the engine. Angle encoders producing phase outputs attached to the front and rear ends of the crankshaft have their outputs sampled by a phase locked loop to produce instantaneous velocity signals for each unit of crankshaft and a phase comparator connected to both encoder outputs produces a signal proportional to shaft twist. The velocity signals are each differentiated to produce acceleration signals and a calculation circuit scales and combines various signals according to the equation $T = A\ddot{\theta}_1 - B\ddot{\theta}_2 + C\dot{\theta}_1 - E\dot{\theta}_2 + F(\theta_1 - \theta_2)$ where T is the engine torque and A, B, C, E and F are constants.

4 Claims, 3 Drawing Figures

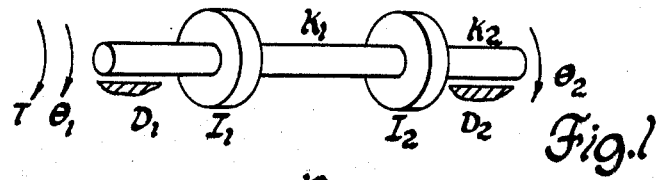
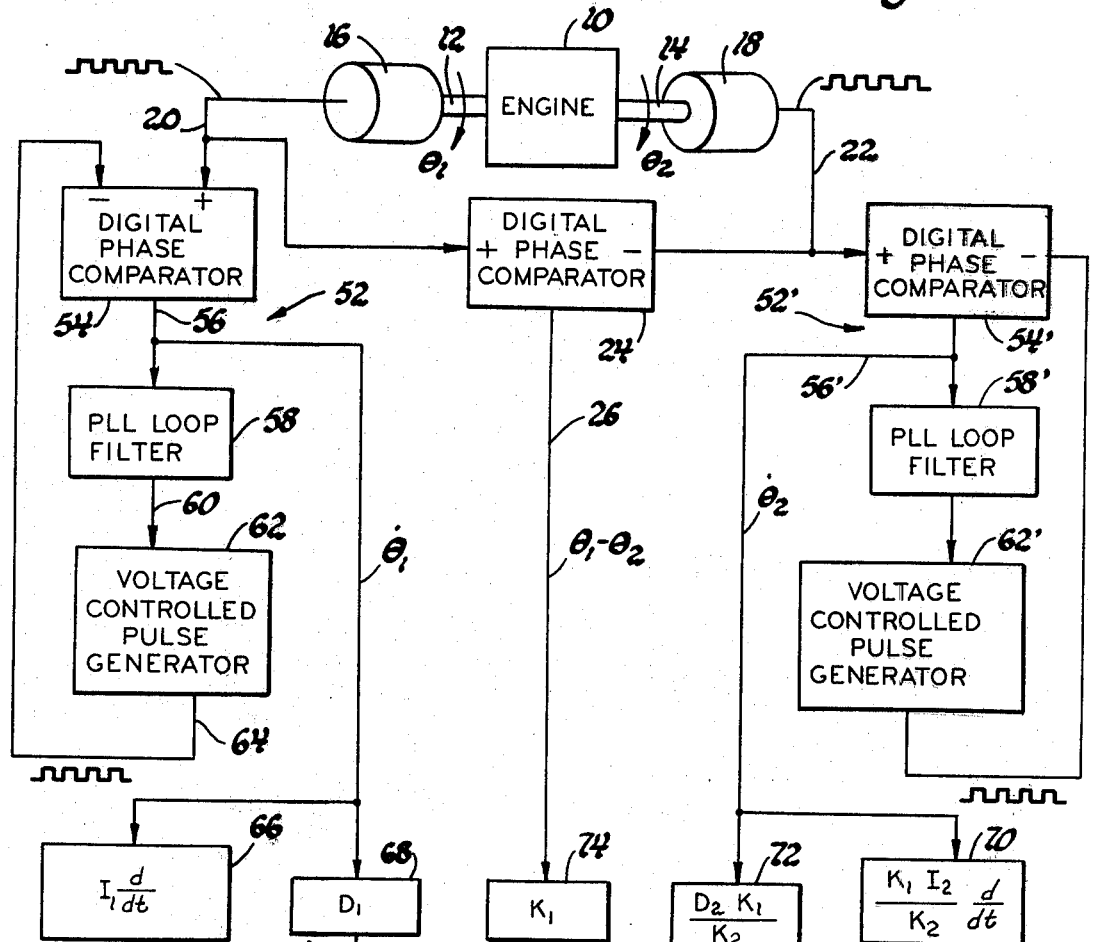
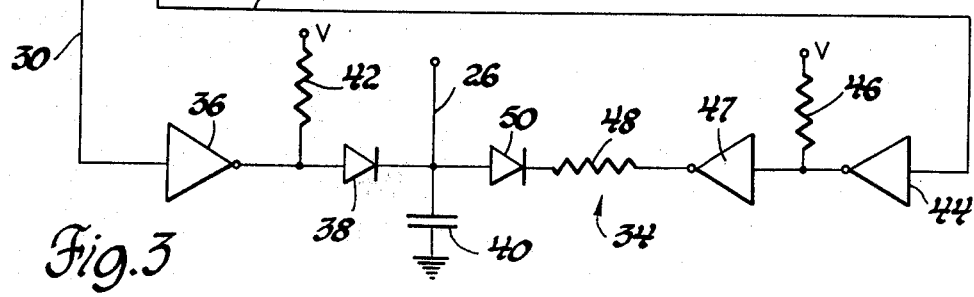

APPARATUS FOR MEASURING ENGINE TORQUE

This invention relates to an engine torque indicator for producing an electrical signal representing instantaneous torque values.

It is desirable to be able to obtain a measure of engine torque in a practical manner for use in engine analysis and further for use in engine fuel control systems which rely on instantaneous torque values to optimize the control of the engine.

It is therefore a general object of this invention to provide an apparatus for generating an electrical torque signal. It is a further object to provide such an apparatus having a signal representing instantaneous engine torque.

The invention is carried out by providing angle encoders responsive to rotation of both the front and the rear ends of an engine crankshaft to produce rotation signals, a phase locked loop circuit responsive to each rotation signal to produce instantaneous velocity signals, a phase comparator responsive to the rotation signals to produce a crankshaft twist signal, circuits to produce acceleration signals from the velocity signals and a calculation circuit for scaling and combining the velocity, twist and acceleration signals to produce an output signal representing instantaneous engine torque.

The above and other advantages will be made more apparent from the following specification taken in conjunction with the accompanying drawings wherein like reference numerals refer to like parts and wherein:

FIG. 1 is a diagrammatic model of an engine crankshaft illustrating the forces operating thereon, FIG. 2 is a block diagram of a torque measuring circuit according to the invention, and FIG. 3 is a combined block and schematic diagram of a phase comparator of FIG. 2.

The subject invention is grounded on the premise that a measure of engine torque can be obtained by measuring the differences between crankshaft oscillations at the front (unloaded) end of the engine and the rear (loaded) end. FIG. 1 is a simplified model of an engine crankshaft for a one cylinder internal combustion engine. In the model, $I_1$ and $I_2$ represent rotational inertias of the crankshaft, $K_1$ and $K_2$ represent rotational compliances, $D_1$ and $D_2$ represent rotational dampers, $\theta_1$ and $\theta_2$ are angular coordinates, and T is time varying torque. In each case the symbol bearing a subscript 2 represents a parameter associated with the front or free end of the crankshaft, whereas the subscript 1 refers to the loaded end or, in the case of compliance, the center of the crankshaft as revealed in the diagram. Based on this model it can be shown mathematically that the time varying engine torque T can be expressed as follows: $T = I_1\ddot{\theta}_1 - (K_1 I_2/K_2)\ddot{\theta}_2 + D_1\dot{\theta}_1 - (D_2 K_1/K_2)\dot{\theta}_2 + K_1(\theta - \theta_2)$. This torque equation shows that engine torque can be obtained from a properly scaled combination of crankshaft twist, and the crankshafts' end rotational velocities and accelerations.

FIG. 2 is a block diagram of the apparatus required to implement the torque measuring apparatus. An engine 10 has a crankshaft with a rear portion 12 and a front portion 14. Rotary pulse generators or angle encoders 16 and 18 providing digital outputs representing $\theta_1$ and $\theta_2$ are driven by the portions 12 and 14 of the crankshaft respectively. The two encoders are initially aligned so that the leading edges of the pulses produced by each encoder are aligned when there is no net twist between the front and rear of the crankshaft. The lines 20 and 22 carrying the digital pulse trains from the encoders 16 and 18 respectively are connected to the two inputs of a digital phase comparator 24 which produces an output on line 26 which is an analog signal proportional to crankshaft twist or $\theta_1 - \theta_2$.

FIG. 3 depicts the circuitry of the digital phase comparator which is effective to receive digital pulse trains as inputs and to produce an instantaneously time varying analog output. It comprises a phase detector 28 having as inputs the lines 20 and 22 carrying the digital pulse trains representing $\theta_1$ and $\theta_2$. The phase detector 28 is, for example, an integrated circuit MC4044 manufactured by Motorola Corporation. The phase detector output on lines 30 and 32 are normally at a logic 1 level but line 30 will assume a low voltage or logic 0 level when the pulse train on line 20 is lagging that on line 22 and conversely the voltage on line 32 assumes a low level when the pulse train on line 22 is lagging that on line 20. The phase detector outputs 30 and 32 are connected to a charge pump 34 which responds to those output signals to produce on line 26 an analog signal proportional to the phase difference of the signals on lines 21 and 22 or $\theta_1 - \theta_2$. The line 30 is connected to the input of an inverter 36, the output of which is connected through a germanium diode 38 to one side of a capacitor 40, the other side of the capacitor being grounded. The anode of the diode 36 is connected through a resistor 42 to a voltage source V. The line 32 is connected to the input of an inverter 44, the output of which is connected through a resistor 46 to the voltage source V as well as to the input of another inverter 47. The latter inverter is connected through a resistor 48 having the same value as the resistor 42 and to the cathode of a germanium diode 50 having its anode connected to the capacitor 40. The voltage of the capacitor 40 represents the output signal of the charge pump and hence the line 26 is connected to that capacitor.

In operation when the phases of $\theta_1$ and $\theta_2$ are in phase and the logic states on lines 30 and 32 are both one, the output of the charge pump on line 26 is stable, that is, whatever voltage has been induced on the capacitor 40 does not change significantly. When $\theta_1$ is lagging, the voltage on line 30 goes low causing the output of inverter 36 to go high so that the capacitor 40 becomes charged through resistor 42 and diode 38. Similarly, if the signal on line 22 is lagging that of line 20, the voltage on line 32 goes low so that the output of inverter 47 is likewise low thus allowing the capacitor 40 to discharge through the diode 50 and the resistor 48. Since the resistors 48 and 42 are the same value, the rate of charge equals the rate of discharge. The phase difference between the inputs on lines 20 and 22 determines the capacitor voltage, which responds instantaneously to phase change and applies to the output line 26, a voltage representing $\theta_1 - \theta_2$.

Referring again to FIG. 2, the line 20 bearing the $\theta_1$ signal is also fed to a phase locked loop 52, which comprises a digital phase comparator 54, which is like the phase comparator 24 and has one input connected to line 20 and its output on line 56 connected through a low pass filter 58 which generates on its output 60 an analog voltage representing the average of the dynamic signal on line 56. That signal on line 60 is connected to a voltage controlled pulse generator 62 which generates a digital pulse train having a frequency corresponding to the average frequency of the signal on line 20. That pulse generator output on line 64 is connected to the other input of the digital phase comparator 54. With this arrangement, the analog signal on line 56 represents the instantaneous velocity or $\dot{\theta}_1$ of the rear portion of the crankshaft and contains AC as well as DC components of the velocity. That is, it represents not only the average velocity of the crankshaft portion 12 but bears the frequency modulated portions of the velocity signal as well. The signal $\theta_2$ on line 22 is similarly connected to the input of a phase locked loop 52′ comprising a digital phase comparator 54′, a low pass filter 58′ and a voltage controlled pulse generator 62′. The output of the digital phase comparator on line 56′ carries the velocity signal $\dot{\theta}_2$.

The velocity signal or $\dot{\theta}_1$ on line 56 is fed to a differentiating circuit and amplifier 66 having a gain of $I_1$ to produce an output representing $I_1\ddot{\theta}_1$. The differentiator circuit preferably is a bandpass differentiator to minimize noise in the output signal. The signal $\dot{\theta}_1$ on line 56 is also fed to an amplifier 68 having a gain $D_1$ to produce an output representing the term $D_1\dot{\theta}_1$. The $\dot{\theta}_2$ on line 56′ is fed to a bandpass differentiator and amplifier circuit 70 having a gain of $K_1I_2/K_2$ to produce an output representing the term $(K_1I_2/K_2)\ddot{\theta}_2$. The signal $\dot{\theta}_2$ is also fed to an amplifier 72 having a gain $D_2K_1/K_2$ to provide the term proportional to $D_2K_1\dot{\theta}_2/K_2$. Finally, the twist signal $\theta_1-\theta_2$ on line 26 is fed to an amplifier 74 having a gain $K_1$ to produce a term $K_1(\theta_1-\theta_2)$. The velocity, acceleration and twist terms as thus scaled are then algebraically combined at summing junctions 76 to 30 generate the torque signal T according to the torque equation. A low pass filter 78 can be added at the output of the circuit to provide a signal $\overline{T}$ representing the average torque over an engine cycle. Since the coefficients of all the acceleration, velocity and twist terms are constants, the torque equation may be rewritten as follows: $T = A\ddot{\theta}_1 - B\ddot{\theta}_2 + C\dot{\theta}_1 - E\dot{\theta}_2 + F(\theta_1-\theta_2)$ wherein the coefficients A, B, C, E and F represent those constants.

The above description specifically pertains to a single cylinder engine but the apparatus described herein is directly applicable to a multicylinder engine. For a multicylinder engine, the values $D_1$, $D_2$ and $K_1$, $K_2$ vary according to the point of application of the torque along the crankshaft and therefore vary from cylinder to cylinder. However, suitable choices of gains in the signal processing components corresponding to the averages of an engine cycle and low pass filtering of the torque would provide an average torque $\overline{T}$ over an engine cycle. Thus, this arrangement for measuring average torque is useful for providing an accurate real time torque parameter for use in a multicylinder engine control system which determines fuel flow, spark timing and other controllable input parameters in response to torque and other output parameters. On the other hand, an engine analysis system can provide a calculation circuit programmed with appropriate values of $D_1$, $D_2$, $K_1$ and $K_2$ for each cylinder of a multicylinder engine and thereby obtain a dynamic torque signal T containing detailed information about engine operation on a cylinder-by-cylinder basis.

It will thus be seen that according to this invention a rapid and accurate determination of engine torque can be obtained. The principles of the invention are readily embodied in other circuit forms without departing from the spirit of the invention. For example, the digital phase comparators 56 and 56′ can have digital outputs representing $\dot{\theta}_1$ and $\dot{\theta}_2$ and the acceleration values then can be determined by known digital techniques not requiring the bandpass filtering operation. Of course, the remainder of the calculation can also be carried out digitally.

The embodiments of the invention in which an exclusive property or privilege is claimed are defined as follows:

1. An apparatus for generating an electrical engine torque signal comprising angle encoder means responsive to rotation of both the rear and the front ends of the engine crankshaft for producing first and second electrical digital rotation signals, a phase-locked-loop circuit responsive to each of the rotation signals for producing first and second instantaneous velocity signals, a phase comparator having the first and second rotation signals as inputs for producing an output signal representing crankshaft twist, circuit means responsive to the first and second velocity signals to generate corresponding first and second acceleration signals, and means for scaling and combining the velocity, twist and acceleration signals to produce an output signal representing engine torque.

2. An apparatus for generating an electrical engine torque signal comprising angle encoder means responsive to rotation of both the rear and the front ends of the engine crankshaft for producing first and second electrical digital rotation signals, a phase-locked-loop circuit responsive to each of the rotation signals for producing first and second instantaneous velocity signals, each phase-locked-loop circuit comprising a phase comparator having a first input connected to receive its respective rotation signal, a low pass filter connected to the comparator output, a voltage controlled oscillator connected to the filter so that the oscillator output frequency is dependent on the filtered output of the comparator and the oscillator output being connected to a second input of the phase comparator whereby the instantaneous velocity signal is the output of the phase comparator, a further phase comparator having the first and second rotation signals as inputs for producing an output signal representing crankshaft twist, circuit means responsive to the first and second velocity signals to generate corresponding first and second acceleration signals, and means for scaling and combining the velocity, twist and acceleration signals to produce an output signal representing engine torque.

3. An apparatus for generating an electrical engine torque signal comprising angle encoder means responsive to rotation of both the rear and the front ends of the engine crankshaft for producing first and second electrical digital rotation signals, $\dot{\theta}_1$ and $\dot{\theta}_2$ respectively, a phase-locked-loop circuit responsive to each of the rotation signals for producing first and second instantaneous velocity signals, $\dot{\theta}_1$ and $\dot{\theta}_2$ respectively, a phase comparator having the first and second rotation signals as inputs for producing an output signal $(\theta_1-\theta_2)$ representing crankshaft twist, circuit means responsive to the first and second velocity signals to generate corresponding first and second acceleration signals, $\ddot{\theta}_1$ and $\ddot{\theta}_2$ respectively, and means for scaling and combining the velocity, twist and acceleration signals according to the equation $T = A\dot{\theta}_1 - B\dot{\theta}_2 + C\ddot{\theta}_1 - E\ddot{\theta}_2 + F(\theta_1 - \theta_2)$ to produce an output signal representing engine torque T where A, B, C, E and F are constants.

4. An apparatus for generating an electrical engine torque signal comprising angle encoder means responsive to rotation of both the rear and the front ends of the engine crankshaft for producing first and second electrical digital rotation signals, a phase-locked-loop circuit responsive to each of the rotation signals for producing first and second instantaneous velocity signals, each phase-locked-loop circuit including a phase comparator having digital inputs comprising one of the rotation signals and a digital average velocity signal, a low pass filter connected at the comparator output, and a voltage controlled oscillator responsive to the filtered comparator output for generating the said average velocity signal, a further phase comparator having the first and second rotation signals as inputs for producing an output signal representing crankshaft twist, each phase comparator including an output circuit comprising a digital to analog converter producing an analog twist or instantaneous velocity signal, bandpass differentiators responsive to the first and second instantaneous velocity signals to generate corresponding first and second acceleration signals, and means for scaling and combining the velocity, twist and acceleration signals to produce an output signal representing engine torque.

* * * * *

UNITED STATES PATENT AND TRADEMARK OFFICE
CERTIFICATE OF CORRECTION

PATENT NO. : 4,249,416
DATED : February 10, 1981
INVENTOR(S) : Allan J. Kotwicki It is certified that error appears in the above-identified patent and that said Letters Patent are hereby corrected as shown below:

Column 4, claim 3, line 59, "$\theta_1$ and $\theta_2$" should read -- $\dot{\theta}_1$ and $\dot{\theta}_2$ --.

Column 4, claim 3, line 62, "$\theta_1$ and $\theta_2$" should read -- $\dot{\theta}_1$ and $\dot{\theta}_2$ --.

Signed and Sealed this

Nineteenth Day of May 1981

[SEAL]

Attest:

RENE D. TEGTMEYER

Attesting Officer

Acting Commissioner of Patents and Trademarks